(12) United States Patent
Liu

(10) Patent No.: US 11,224,075 B2
(45) Date of Patent: Jan. 11, 2022

(54) METHOD, USER EQUIPMENT, AND BASE STATION FOR CONTROLLING RANDOM ACCESS TO NETWORK

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 58 days.

(21) Appl. No.: 16/611,022

(22) PCT Filed: May 5, 2017

(86) PCT No.: PCT/CN2017/083292
§ 371 (c)(1),
(2) Date: Nov. 5, 2019

(87) PCT Pub. No.: WO2018/201467
PCT Pub. Date: Nov. 8, 2018

(65) Prior Publication Data
US 2020/0187259 A1 Jun. 11, 2020

(51) Int. Cl.
*H04W 74/08* (2009.01)
*H04B 7/08* (2006.01)
(Continued)

(52) U.S. Cl.
CPC ........ *H04W 74/0833* (2013.01); *H04B 7/088* (2013.01); *H04W 56/001* (2013.01);
(Continued)

(58) Field of Classification Search
None
See application file for complete search history.

(56) References Cited

U.S. PATENT DOCUMENTS

2010/0034162 A1* 2/2010 Ou .................. H04L 1/1887
370/329
2015/0063203 A1 3/2015 Kim et al.
(Continued)

FOREIGN PATENT DOCUMENTS

CN 103765792 A 4/2014
CN 105532069 A 4/2016
(Continued)

OTHER PUBLICATIONS

3GPP TSG RAN WG1 NR Ad Hoc Meeting "*RACH preamble design for NR*", Spokane, USA, Jan. 16-20, 2017, 12 pgs.
(Continued)

*Primary Examiner* — Kenny S Lin
(74) *Attorney, Agent, or Firm* — Finnegan, Henderson, Farabow, Garrett & Dunner, L.L.P.

(57) ABSTRACT

Provided in the present disclosure are a method, user equipment, and a base station for controlling random access to a network. The method comprises: sending random access preambles to a base station through at least two consecutive beams, wherein the preambles carried by two adjacent beams belong to different preamble groups; receiving a random access response message sent by the base station in response to the preambles; accessing a network according to the random access response message. Employing the method for controlling the random access to a network provided in the present disclosure improves a success rate and reliability of random access to a network for user equipment in a 5G network.

19 Claims, 10 Drawing Sheets

(51) Int. Cl.
  *H04W 72/04* (2009.01)
  *H04W 56/00* (2009.01)
  *H04W 88/10* (2009.01)

(52) U.S. Cl.
  CPC ..... *H04W 72/046* (2013.01); *H04W 72/0466* (2013.01); *H04W 88/10* (2013.01)

(56) References Cited

U.S. PATENT DOCUMENTS

| | | | | |
|---|---|---|---|---|
| 2016/0192401 | A1* | 6/2016 | Park | H04W 72/046 370/329 |
| 2017/0303224 | A1* | 10/2017 | Choi | H04W 48/12 |
| 2018/0152882 | A1* | 5/2018 | Frenger | H04W 48/12 |
| 2018/0302928 | A1* | 10/2018 | Axen | H04W 74/008 |
| 2019/0150218 | A1* | 5/2019 | Futaki | H04W 80/08 370/329 |
| 2019/0281639 | A1* | 9/2019 | Yang | H04B 7/0617 |

FOREIGN PATENT DOCUMENTS

| | | |
|---|---|---|
| CN | 107223361 A | 9/2017 |
| EP | 2 949 055 | 7/2014 |
| WO | WO 2017/022870 A1 | 2/2017 |
| WO | WO 2017/022902 A1 | 2/2017 |

OTHER PUBLICATIONS

3GPP TSG-RAN WG2 Meeting #95bis, "*Consideration on random access in NR*", Kaohsiung, October 10-14, 2016, 7 pgs.

International Search Report for International Application No. PCT/CN2017/083292, dated Jan. 29, 2018.

Huawei, HiSilicon, "*RACH Procedures and Resource Configuration*", 3GPP TSG RAN WG1 Meeting #88, Athens, Greece, Feb. 13-17, 2017, 7 pgs.

Extended European Search Report in the European Application No. 17908276.3, dated Oct. 5, 2020.

Sharp, RACH procedure for multi-Tx beam operation, 3GPP TSG RAN WG1 NR Ad-Hoc Meeting, R1-1700736, Spokane, USA, Jan. 16-20, 2017, 3 pages.

* cited by examiner

METHOD, USER EQUIPMENT, AND BASE STATION FOR CONTROLLING RANDOM ACCESS TO NETWORK

CROSS REFERENCE TO RELATED APPLICATIONS

This application is a national phase application based on PCT/CN2017/083292, filed May 5, 2017, the content of which is incorporated herein by reference.

TECHNICAL FIELD

The present disclosure relates to a method, user equipment, and a base station for controlling random access to a network.

BACKGROUND

Beam sweeping technology is one of key technologies in the 5G network communication system, and communication process of beam sweeping technology is generally as follows: a transmitting terminal, such as the base station gNB, periodically sweep a cell, where a receiving terminal such as User Equipment (UE) are located, by a high frequency beam with frequency point above 6 GHz through a large-scale antenna array; after receiving the high frequency beam, the receiving terminal establishes a communication connection with the transmitting terminal, thereby transmitting and receiving information through the high frequency beam.

When establishing a communication connection, the user equipment is first required to send a random access request to the base station to establish a communication connection between the base station and the user equipment. The first step of process of the random access is to transmit a random access preamble. The main function of the preamble is to inform the base station that there is a random access request, which makes it possible for the base station to estimate transmission delay between it and the User Equipment (UE). Based on this, the base station can calibrate the uplink timing and inform UE of the calibration information, so as to implement uplink synchronization between the UE and the base station.

According to the characteristics of the beam sweeping of 5G network, the high frequency beam is periodically sent, so that the UE cannot send the random access preamble to the base station in an omnidirectional manner. If the UE is in the overlapping coverage area of multiple beams, such as two beams, it is necessary for the UE to select a beam with random access channel of good performance as a target access beam to ensure quality of subsequent communication.

SUMMARY

To overcome the problems existing in the related arts, embodiments of the present disclosure provide a method, user equipment, and a base station for controlling random access to a network, so as to improve reliability of the random access to the network for user equipment in a 5G network.

According to a first aspect of the embodiments of the present disclosure, there is provided a method for controlling random access to a network, which is applicable to the user equipment, the method comprising:

sending random access preambles to a base station through at least two consecutive beams, wherein the preambles carried by the two consecutive beams belong to different preamble groups:

receiving a random access response message sent by a base station in response to the preambles:

accessing the network according to the random access response message.

Optionally, sending the random access preambles to the base station through the at least two consecutive beams comprises:

after detecting a synchronization signal beam, determining estimated arrival times of the at least two consecutive target beams, wherein the target beam is configured to send the preambles:

selecting a target preamble for each of the target beams according to a preset preamble group;

determining configuration information of each target preamble according to preset transmission configuration information, wherein the configuration information of each target preamble comprises at least one of the following: a scrambling code for scrambling, a time domain resource carrying the target preamble, and a frequency domain resource carrying the target preamble; and sending, according to the configuration information of each target preamble, the target preamble to the base station in an arrival time range of the respective target beam.

Optionally, sending, according to the configuration information of each target preamble, the target preamble to the base station, comprises:

scrambling the target preamble with a preset scrambling code so as to obtain a scrambled preamble.

And sending the scrambled preamble to the base station through the target beam.

Optionally, sending, according to the configuration information of each target preamble, the target preamble to the base station, comprises:

sending the target preamble to the base station with a preset time domain resource of the target beam.

Optionally, sending, according to the configuration information of each target preamble, the target preamble to the base station, comprises:

sending the target preamble to the base station with a preset frequency domain resource of the target beam.

Optionally, accessing the network according to the random access response message comprises:

if a random access response message is received, accessing the network through a target access beam indicated by the random access response message.

Optionally, accessing the network according to the random access response message comprises:

if at least two random access response messages are received, selecting one of access beams indicated by the at least two random access response message as a target access beam;

accessing the network through the target access beam.

Optionally, before sending the random access preambles to a base station through the at least two consecutive beams, the method further comprises:

obtaining preamble uplink configuration information, wherein, the preamble uplink configuration information comprises: a preset number of target beams, preset preamble group information, and preset transmission configuration information.

According to a second aspect of the embodiments of the present disclosure, there is provided a method for controlling random access to a network, which is applicable to user equipment, the method comprising:

detecting preambles continuously sent by a preset number of beams:

identifying target preambles sent by same user equipment;

sending a random access response message to the user equipment according to received signal-to-noise ratios of the one target preamble, so that the user equipment accesses the network according to the random access response message.

Optionally, identifying the target preambles sent by the same user equipment, comprises:

descrambling the scrambled preambles sent by the preset number of consecutive beams to obtain the preambles and first parsing information; wherein, the first parsing information comprises: a descrambling code corresponding to each preamble and a group identifier of the preamble group to which the preamble belongs:

if the descrambling codes of the at least two preambles are identical, and the group identifiers of the preambles transmitted by adjacent beams are different, determining that the at least two preambles are from the same user equipment.

Optionally, identifying the target preambles sent by the same user equipment, comprises:

determining a time domain resource of each preamble sent by the consecutive beams and the group identifiers of the preamble groups to which the preambles belong:

if the time domain resources of the at least two preambles meet preset preamble time domain configuration information, and the group identifiers of the preambles transmitted by adjacent beams are different, determining that the at least two preambles are from the one user equipment.

Optionally, identifying the target preambles sent by the one user equipment, comprises:

identifying a frequency domain resource of each preamble sent by the consecutive beams and group identifiers of the preamble groups to which the preambles belong;

if the frequency domain resources of the at least two preambles meet preset preamble frequency domain configuration information, and the group identifiers of the preambles transmitted by adjacent beams are different, determining that the at least two preambles are from the same user equipment.

Optionally, sending the random access response message to the user equipment according to the received signal-to-noise ratios of the target preamble, comprises:

determining the received signal-to-noise ratio of the target beam carrying each of the target preambles:

judging whether each of the received signal-to-noise ratios exceeds a preset signal-to-noise ratio threshold;

sending a random access response message to the user equipment through a target beam with a greatest received signal-to-noise ratio, if at least one received signal-to-noise ratio is greater than a preset signal-to-noise ratio threshold.

Optionally, sending a random access response message to the user equipment according to the received signal-to-noise ratios of the target preamble, further comprises:

if the received signal-to-noise ratio of the at least two target preambles is greater than the preset signal-to-noise ratio threshold, and difference between every two received signal-to-noise ratios is less than a preset threshold, sending a random access response message in response to each of the target preambles.

According to a third aspect of the embodiments of the present disclosure, there is provided user equipment, which comprises:

a sending module, configured to send random access preambles to a base station through at least two consecutive beams, wherein preambles carried by the at least two adjacent beams belong to different preamble groups;

a response receiving module, configured to receive a random access response message sent by the base station in response to the preambles; and a request accessing module, configured to access a network according to the random access response message.

Optionally, the sending module comprises:

a time determining submodule, configured to determine an estimated arrival time of at least two consecutive target beams after detecting a synchronization signal beam, wherein the target beams are used to send the preambles;

a selecting submodule, configured to select a target preamble for each of the target beams according to a preset preamble group;

a configuration information determining submodule, configured to determine configuration information of each target preamble according to preset transmission configuration information, wherein the configuration information of each target preamble comprises at least one of the following: a scrambling code for scrambling, a time domain resource carrying the target preamble, and a frequency domain resource carrying the target preamble.

a sending submodule, configured to send the target preamble to the base station in an arrival time range of the respective target beam according to the configuration information of each target preamble.

Optionally, the sending submodule comprises:

a scrambling unit, configured to scramble the target preamble with a preset scrambling code so as to obtain a scrambled preamble.

a first sending unit, configured to send the scrambled preamble to the base station through the target beam.

Optionally, the sending submodule comprises:

a second sending unit, configured to send the target preamble to the base station through a preset time domain resource of the target beam.

Optionally, the sending submodule comprises:

a third sending unit, configured to send the target preamble to the base station through a preset frequency domain resource of the target beam.

Optionally, the response receiving module comprises:

a first receiving submodule, configured to, if a random access response message is received, access the network through a target access beam indicated by the random access response message.

Optionally, the response receiving module comprises:

an access beam selecting submodule, configured to, if at least two random access response messages are received, select one of target access beams indicated by each of the response messages as a target access beam;

a second receiving submodule, configured to access the network through the target access beam.

Optionally, the device further comprises:

a configuration information acquiring module, configure to obtain preamble uplink configuration information, wherein, the preamble uplink configuration information comprises: a preset number of target beams, preset preamble group information, and preset transmission configuration information.

According to a fourth aspect of the embodiments of the present disclosure, there is provided a base station, which comprises:

a detecting module, configured to detect preambles continuously sent by a preset number of beams;

an identifying module, configured to identify target preambles sent by same user equipment;

a response sending module, configured to send a random access response message to the same user equipment according to the received signal-to-noise ratios of the target preambles, so that the same user equipment accesses the network according to the random access response message.

Optionally, the identifying module comprises:

a first parsing submodule, configured to descramble scrambled preambles sent through the preset number of consecutive beams so as to obtain preambles and first parsing information; wherein, the first parsing information comprises: a descrambling code corresponding to each preamble and a group identifier of the preamble group to which the preamble belongs;

a first determining submodule, configured to: if the descrambling codes of the at least two preambles are identical, and the group identifiers of the preambles transmitted through adjacent beams are different, determine that the at least two preambles are from the same user equipment.

Optionally, the identifying module comprises:

a second parsing submodule, configured to determine a time domain resource of each preamble sent through the consecutive beams and a group identifier of the preamble group to which the preamble belongs;

a second determining submodule, configured to: if time domain resources of the at least two preambles meet preset preamble time domain configuration information, and the group identifiers of the preambles transmitted through adjacent beams are different, determine that the at least two preambles are from the same user equipment.

Optionally, the identifying module comprises:

a third parsing submodule, configured to determine a time domain resource of each preamble sent through consecutive beams and a group identifier of the preamble group to which the preamble belongs;

a third determining submodule, configured to: if frequency domain resources of the at least two preambles meet preset preamble frequency domain configuration information, and the group identifiers of the preambles transmitted through adjacent beams are different, determine that the at least two preambles are from the same user equipment.

Optionally, the response sending module comprises:

a signal-to-noise ratio determining submodule, configured to determine a received signal-to-noise ratio of each target preamble;

a judging submodule, configured to judge whether each of the received signal to noise ratios exceeds a preset signal-to-noise ratio threshold;

a first sending submodule, configured to send a random access response message to the user equipment by means of a target beam with a greatest received signal-to-noise ratio, if a received signal-to-noise ratio of at least one target preamble is greater than the preset signal-to-noise ratio threshold.

Optionally, the response sending module comprises:

a second sending submodule, configured to: send a random access response message for each of the target preambles if received signal-to-noise ratios of at least two target preambles are greater than the preset signal-to-noise ratio threshold, and difference between every two received signal-to-noise ratios is less than a preset threshold.

According to a fifth aspect of the embodiments of the present disclosure, there is provided a non-transitory computer readable storage medium having a computer instruction stored thereon, wherein the instruction is executed by a processor to implement the steps of the methods in the first aspect.

According to a sixth aspect of the embodiments of the present disclosure, there is provided a non-transitory computer readable storage medium having a computer instruction stored thereon, wherein the instruction is executed by a processor to implement the steps of the methods in the second aspect.

According to a seventh aspect of the embodiments of the present disclosure, there is provided user equipment, which comprises:

a processor:

a memory configured to store instructions executable by the processor:

wherein the processor is configured to:

send random access preambles to a base station through at least two consecutive beams, wherein the preambles carried by two adjacent beams belong to different preamble groups;

receive a random access response message sent by a base station in response to the preambles; and access a network according to the random access response message.

According to an eighth aspect of the embodiments of the present disclosure, there is provided a base station, which comprises:

a processor:

a memory configured to store instructions executable the processor:

wherein the processor is configured to:

detect a preamble continuously sent by a preset number of beams;

identify target preambles sent by same user equipment;

sending a random access response message to the user equipment according to the received signal-to-noise ratio of the target preamble, so that the user equipment accesses a network according to the random access response message.

The technical solutions provided by the embodiments of the present disclosure can comprise the following beneficial effects:

In the present disclosure, when the user equipment is in an overlapping coverage area of at least two sweeping beams, the user equipment can send a random access preamble to a base station through at least two consecutive beams, so that the base station obtains the preambles through the different beams, and identify which beam has a random access channel with good performance according to the received signal-to-noise ratio of the target beams carrying the preambles. Based on this, the base station can, through the random access response message, instruct the user equipment to select a beam with a good channel performance as a target access beam, so as to enhance reliability of random access and ensure quality of subsequent communications.

It is to be understood that both the foregoing general description and the following detailed description are exemplary and explanatory only and should not be taken as a limit to the present disclosure.

BRIEF DESCRIPTION OF THE DRAWINGS

The attached drawings herein are incorporated into the specification and form part of the specification, illustrate embodiments consistent with the disclosure and explain the principles of the invention in connection with the specification.

DETAILED DESCRIPTION

Exemplary embodiments will be described in detail herein, examples of which are illustrated in the accompanying drawings. The same reference signs refers to the same or similar elements in the different figures unless otherwise indicated. The embodiments described in the following exemplary embodiments do not represent all embodiments consistent with the present disclosure. Instead, they are merely examples of devices and methods consistent with aspects of the disclosure as set forth in the appended claims.

The executing subject of the present disclosure comprises: a base station and user equipment (UE), wherein the base station can be a base station, a sub base station, provided with a large-scale antenna array, or the like, and the user equipment UE can be a user terminal, a user node, a mobile terminal, or a tablet. In a specific implementing process, the base station and the user equipment are independent of each other, and are linked to each other to jointly implement the technical solution provided by the present disclosure.

According to the related knowledge, each cell is assigned a preset available number of preamble sequences for random access, such as 64 or 128 preamble sequences. These sequences can be divided into two parts, one for contention based random access and the other for non-contention based random access.

The random access preambles involved in the embodiments of the present disclosure all belong to a contention based random access preamble sequence.

Figure 1:
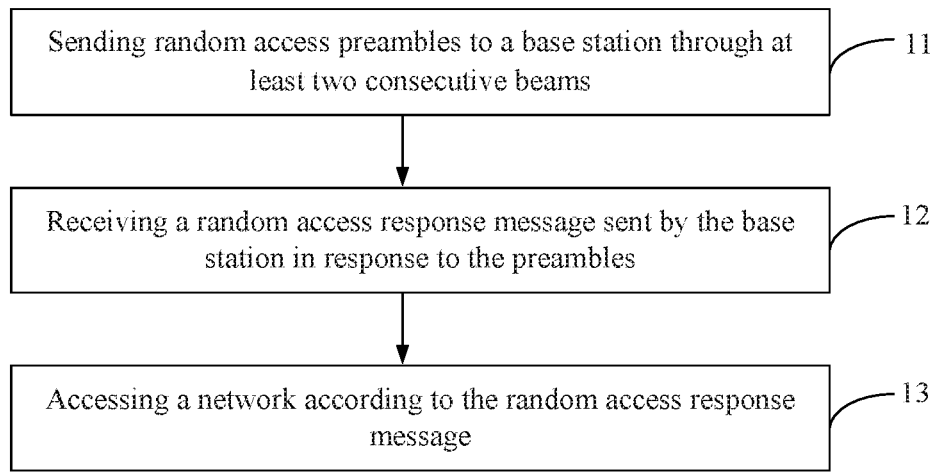
FIG. 1 is a flowchart of a method for controlling random access to a network according to an exemplary embodiment of the present disclosure.
Figure 2:
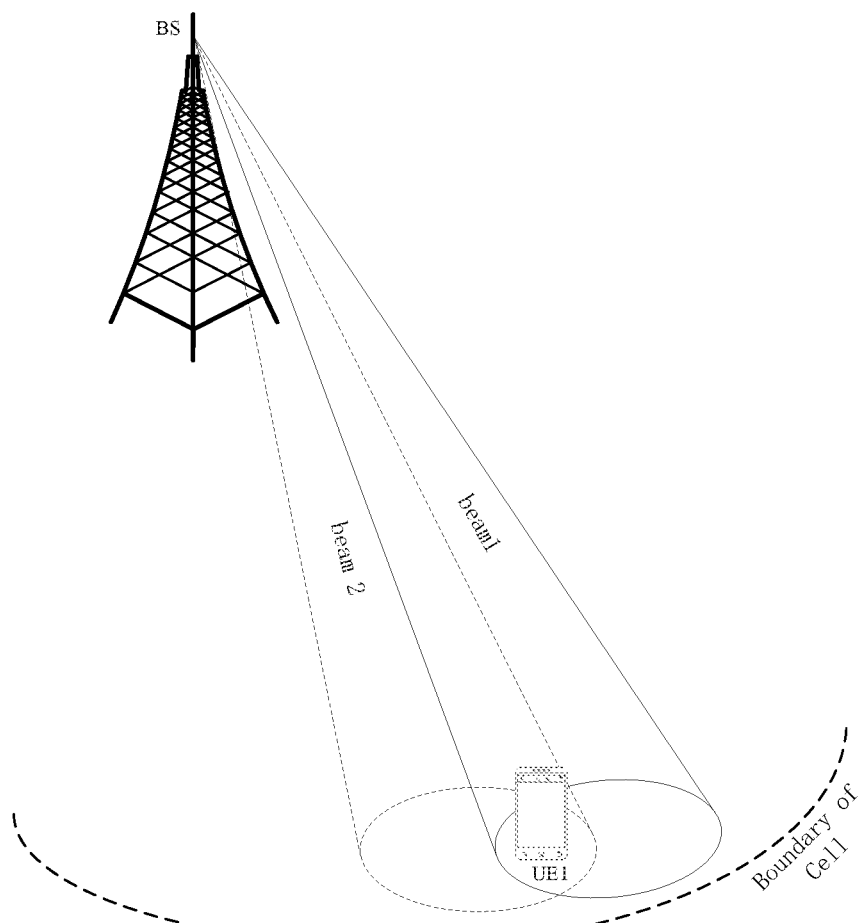
FIG. 2 is a schematic diagram of an application scenario of controlling random access to a network according to an exemplary embodiment of the present disclosure.

Based on the above application scenarios, the present disclosure provides a method for controlling random access to a network. Referring to FIG. 1, a flowchart of a method for controlling random access to a network according to an exemplary embodiment, the method can comprise the following steps:

In step 11, sending random access preambles to a base station through at least two consecutive beams, wherein the preambles carried by the two adjacent beams belong to different preamble groups:

In the present disclosure, in order to improve the success rate of the random access of the user equipment to a network, a corresponding number of preambles are continuously sent to the base station (BS) with at least two beams, referring to FIG. 2, which is a schematic diagram of an application scenario for controlling random access to a network according to an exemplary embodiment. In order to prevent same preambles sent through adjacent beams from interfering with the base station, it is required that preambles sent through two adjacent beams are different.

In an embodiment of the present disclosure, after determining that a random access request can be sent, a UE can select a preamble to send to a base station in real time when a target beam arrives.

In another embodiment of the present disclosure, after determining that a random access request can be sent, alternatively, a UE can allocate a target preamble to each target beam before a target beam arrives, so that a target preamble can be loaded and sent immediately when each target beam arrives, saving the time for selecting a target preamble, and improving transmission efficiency of the preamble.

Figure 3:
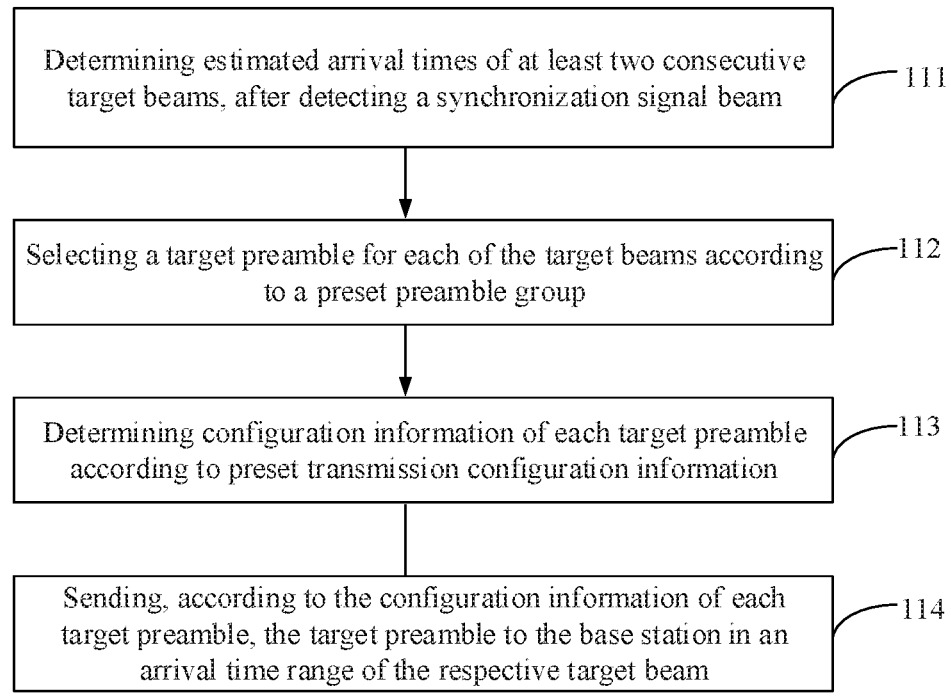
FIG. 3 is a flowchart of another method for controlling random access to a network according to an exemplary embodiment of the present disclosure.

Referring to FIG. 3, a flowchart of another method for controlling random access to a network according to an exemplary embodiment, the above step 11 can comprise the following steps:

In step 111, determining estimated arrival times of the at least two consecutive target beams, after detecting a synchronization signal beam:

In the embodiment of the present disclosure, the system can arrange a number of target beams for sending the preamble. For example, a UE may continuously send the preambles to the base station through using 2 or 3 target beams.

Taking the user equipment UE1 as an example, according to the periodicity of the beam sweeping of the 5G network, after detecting a synchronization signal beam, the UE1 determines that the subsequent beams can be used to initiate a random access request to the base station, and the estimated arrival time of the subsequent preset number of target beams can be calculated according to the current time and the beam sweeping period. The estimated arrival time can comprise: an estimated arrival moment, and a duration. The above target beam refers to a beam that can transmit a preamble.

Taking three target beams as an example, the relationship between a target beam and an estimated arrival time may be as illustrated in Table 1 below:

TABLE 1

| Beam Sequence | Estimated Arrival Moment |
| --- | --- |
| Beam 1 | T1 |
| Beam 2 | T2 |
| Beam 3 | T3 |

In Table 1, three beams: Beam 1, Beam 1, and Beam 3, the respective estimated arrival times are: T1, T2, and T3.

In step 112, selecting a target preamble for each of the target beams according to a preset preamble group;

The present disclosure may select a target preamble for each of target beams according to preset preamble group information.

In an embodiment of the present disclosure, a contention based random access preamble sequence configured for one cell by the system can be grouped. Depending on whether the preamble sequence is increased relative to the related art, the following two cases can be comprised:

In a first case, the original preamble sequence for the cell is grouped.

For convenience in illustration, it is assumed that the current cell in which a UE is located is allocated a total of 10 available preambles, and the corresponding preamble sequences are 0 to 9.

In the embodiment of the present disclosure, the foregoing 10 preambles may be divided into two groups, namely, group 1 and group 2, wherein group 1 comprises preamble sequences 0 to 4. And group 2 comprises: preambles sequences 5 to 9.

Exemplarily, the preamble group may be used to select a target preamble for the three target beams listed in Table 1, to ensure that the preambles of the adjacent beams are from different groups so as to avoid mutual interference. Correspondence between the preamble information and the target beam may be as illustrated in Table 2 below:

TABLE 2

| Beam Sequence | Target preamble | Group Identifier |
| --- | --- | --- |
| Beam 1 | 0 | group 1 |
| Beam 2 | 5 | group 2 |
| Beam 3 | 2 | group 1 |

It can be seen from Table 2 that although the target preambles allocated by beam 1 and beam 3 belong to the first group, that is, group 1, the two beams are not adjacent and do not interfere distinguishing the beams by the base station.

In a second case, an original preamble sequence is increased and then grouped, and target preambles allocated for each beam belong to different preamble groups.

Still taking the relevant technology which has 10 available preambles as an example, in the embodiment of the present disclosure, a number of available preambles can be increased to 15, that is, the corresponding preamble sequence is: preamble sequences 0 to 14. These preambles may be divided into three groups, which are respectively represented as: group 1 {0, 4}; group 2 {5, 9}; group 3 {10, 14}.

Then, one target preamble can be selected for each of the three target beams illustrated in Table 1 from the above three different groups. For example, as illustrated in Table 3 below:

TABLE 3

| Beam Sequence | Target Preamble | Group Identifier |
| --- | --- | --- |
| Beam 1 | 0 | group 1 |
| Beam 2 | 5 | group 2 |
| Beam 3 | 11 | group 3 |

With the grouping manner of the embodiment of the present disclosure, the preambles sent through the three target beams belong to different preamble groups, which can improve accuracy and reliability of determining the target access beam by the base station according to the preamble. Wherein, the target access beam is a beam that the base station can use to instruct the UE to initiate a random access request in the random access response message.

In step 113, determining configuration information of each target preamble according to preset transmission configuration information, wherein the configuration information of each target preamble comprises at least one of the following: a scrambling code for scrambling, a time domain resource carrying the target preamble, and a frequency domain resource carrying the target preamble.

In the embodiment of the present disclosure, the system may preset transmission configuration information, which is used to instruct the UE how to continuously send the preamble, so that the base station may determine that multiple preambles received continuously are from same user equipment.

In step 114, sending, according to the configuration information of each target preamble, the target preamble to the base station in an arrival time range of the respective target beam.

It is assumed that each beam stays in the area where the user equipment is located for a period of time $\Delta t$. In the embodiment of the present disclosure, the UE can send a target preamble to the base station according to the configuration information of each target preamble in at least one of the following manners:

First Manner: Scrambling Transmission

Figure 4:
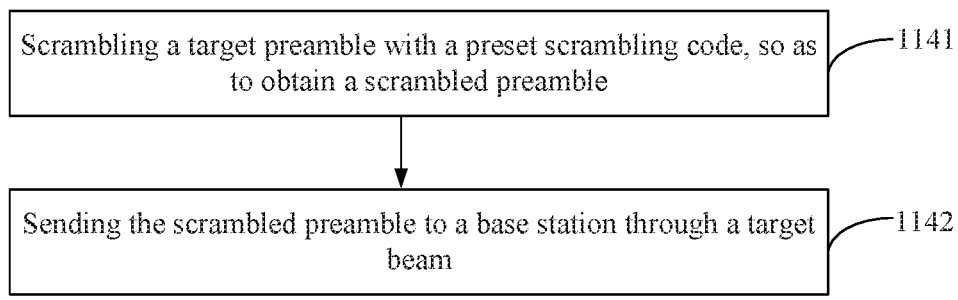
FIG. 4 is a flowchart of another method for controlling random access to a network according to an exemplary embodiment of the present disclosure.

Referring to FIG. 4, a flowchart of another method for controlling random access to a network according to an exemplary embodiment, the above step 11 can comprise the following steps:

In step 1141, scrambling a target preamble with a preset scrambling code, so as to obtain a scrambled preamble;

In step 1142, sending the scrambled preamble to a base station through a target beam.

Taking the above table 2 as an example, if a preset scrambling code is scrambling code 1, UE1 will send a first scrambled preamble through beam 1 in a time range: T1+Δt, and the first scrambled preamble is scrambling information obtained by scrambling the first preamble, that is, preamble 0, through scrambling code 1.

Similarly, UE1 will send a second scrambled preamble and a third scrambled preamble respectively in time ranges: T2+Δt and T3+Δt.

The corresponding specific transmission information is illustrated in Table 4 below:

TABLE 4

| Time Range | Beam Sequence | Scrambled Preamble |
|---|---|---|
| T1 + Δt | Beam 1 | First Scrambled Preamble |
| T2 + Δt | Beam 2 | Second Scrambled Preamble |
| T3 + Δt | Beam 3 | Third Scrambled Preamble |

Second Manner: Transmitting Through a Preset Time Domain Resource

The foregoing step 114 may be specifically: the target preamble is sent to the base station within the arrival time range of each target beam through a preset time domain resource of a target beam.

Exemplarily, on the basis of the above Table 2, each target preamble may be sent according to the information illustrated in Table 5-1 below:

TABLE 5-1

| Time Range | Beam Sequence | Target Preamble | Time Domain |
|---|---|---|---|
| T1 + Δt | Beam 1 | 0 | Slot 1 |
| T2 + Δt | Beam 2 | 5 | Slot 1 |
| T3 + Δt | Beam 3 | 2 | Slot 1 |

That is. UE1 sends a target preamble by using the same time domain resource of each beam, that is, slot 1. In the above example, the preset transmission configuration information instructs the UE to send a preamble by using the same time slot resource.

In another embodiment of the present disclosure, preset transmission configuration information may further instruct a UE to send a preamble through different designated time slot resources in different target beams. For example, if beam 1 uses slot 1, beam 2 uses slot 2, and beam 3 uses slot 3, the transmission information can be expressed as:

TABLE 5-2

| Time Range | Beam Sequence | Target Preamble | Time Domain |
|---|---|---|---|
| T1 + Δt | Beam 1 | 0 | Slot 1 |
| T2 + Δt | Beam 2 | 5 | Slot 2 |
| T3 + Δt | Beam 3 | 2 | Slot 3 |

The present disclosure does not limit the instructing manner of a target beam time domain resource.

Third Manner: Transmitting Through a Preset Frequency Domain Resource

The foregoing step 114 can be specifically: the target preamble is sent to the base station through a preset frequency domain resource of a target beam.

The specific transmission information can be as illustrated in Table 6:

TABLE 6

| Time Range | Beam Sequence | Target Preamble | Frequency domain resource domain |
|---|---|---|---|
| T1 + Δt | Beam 1 | 0 | v1 |
| T2 + Δt | Beam 2 | 5 | v2 |
| T3 + Δt | Beam 3 | 2 | v3 |

That is, UE1 sends target preamble 0 to a base station by using radio wave at a first frequency point v1 in beam1 within a range of arrival time of beam1 T1+Δt. Assuming that the frequency band of beam1 is 800 MHz to 810 MHz, a first frequency point v1 is 800 MHz, and UE1 sends target preamble 0 to the base station by using a radio wave with a frequency point at 800 MHz in beam 1.

In the embodiment of the present disclosure, the specified frequency domain resource locations of the beam1, beam2, and beam3 may be the same or different, and Table 6 illustrates different situations. A minimum operating frequency band supported by each UE in the cell needs a frequency band at least comprising the above three beams. Taking the three beams with same frequency band as an example, the operating frequency band of UE1 may be 790 MHz to 820 MHz, comprising 800 MHz to 810 MHz.

And so on, each target preamble is sent to the base station by using a radio wave at specified frequency point in a target beam.

In step 12, receiving a random access response message sent by the base station in response to the preambles;

After receiving preambles sent by the same UE, the base station sends a random access response (RAR) message to the UE according to result of parsing the descrambled preamble.

In the embodiment of the present disclosure, according to the result of parsing the descrambled preamble, a base station may send a random access response message to the UE according to one of the preambles, or may send multiple random access response messages to a UE for multiple preambles.

Correspondingly, after sending the preambles, the UE will monitor a random access response message replied by the base station in the random access response window (RA response window).

In step 13, accessing a network according to the random access response message.

According to the number of random access response messages received by the user equipment in step 12, step 13 may comprise the following two implementation manners:

First implementation manner, step 13 may comprise:

if one random access response message is received, accessing the network through a target access beam indicated by the response message.

Figure 5:
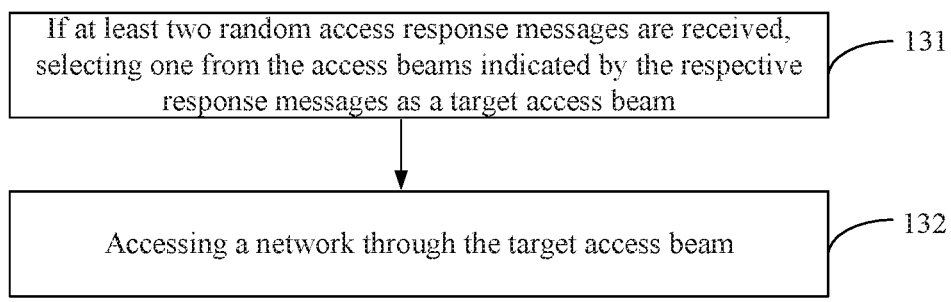
FIG. 5 is a flowchart of another method for controlling random access to a network according to an exemplary embodiment of the present disclosure.

Second implementation manner, referring to FIG. 5, a flowchart of another method for controlling random access to a network according to an exemplary embodiment, the above step 13 can comprise:

In step 131, if at least two random access response messages are received, selecting one from the access beams indicated by the respective response messages as a target access beam;

still taking the UE1 as an example, if random access response messages sent by the base station in response to the three target preambles are received, selecting the strongest beam as a target access beam according to signal strength of the beams carrying the random access response message, for example, if beam2 has the best channel performance, beam2 can be used as a target access beam.

In the step 132, accessing a network through the target access beam.

In subsequent normal communication, a communication connection with the base station is established through a target access beam.

Figure 6:
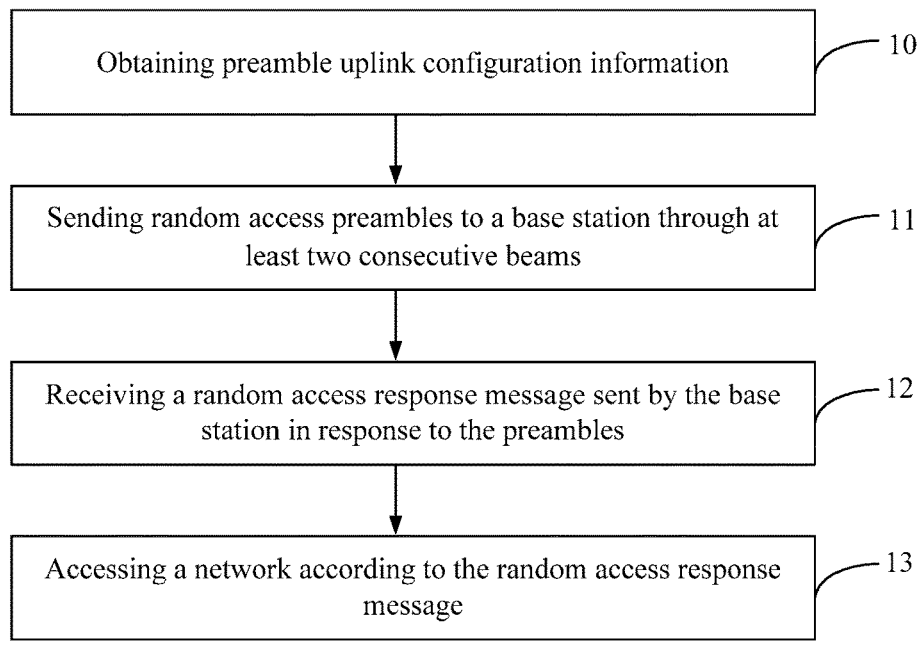
FIG. 6 is a flowchart of another method for controlling random access to a network according to an exemplary embodiment of the present disclosure.

Referring to FIG. 6, a flowchart of another method for controlling random access to a network according to an exemplary embodiment is illustrated. On the basis of the embodiment as illustrated in FIG. 1, the method can further comprise:

in step 10, obtaining preamble uplink configuration information, wherein, the preamble uplink configuration information comprises: a preset number of target beams, preset preamble group information, and preset transmission configuration information.

For the user equipment system initialization or the first request to access the network, preamble uplink configuration information is first obtained to perform related configuration, and random access preambles are sent to a base station through multiple consecutive beams according to the above configuration information.

In summary, adopting the methods according to the present disclosure, a UE can send random access preambles to the base station through at least two consecutive beams, which effectively increases the probability that a base station successfully parses a preamble, thereby improving the reliability of the random access of a UE to a network and improving the efficiency of random access to a network.

Figure 7:
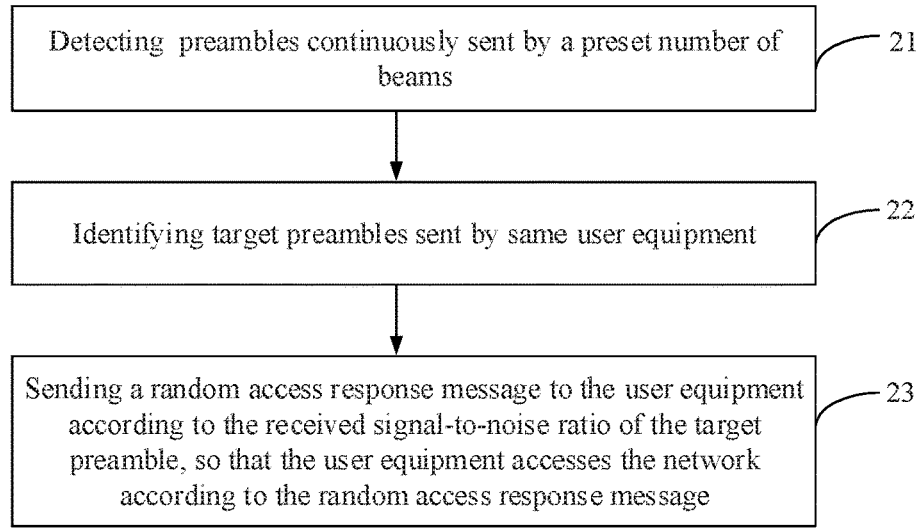
FIG. 7 is a flowchart of a method for controlling random access to a network according to an exemplary embodiment of the present disclosure.

Correspondingly, the present disclosure further provides a method for controlling random access to a network, which is applicable to a base station. Referring to FIG. 7, a flowchart of a method for controlling random access to a network according to an exemplary embodiment is illustrated, the method can comprise the following steps:

in step 21, detecting preambles continuously sent by a preset number of beams;

In the embodiment of the present disclosure, when detecting a preamble that can indicate a UE sending through consecutive beams, a base station starts to detect preambles sent through the consecutive beams, which can comprise at least one of the following cases.

In a first case, the base station detects a scrambled preamble through the current beam, for example, beam1, and continues to obtain scrambled preambles from the subsequent preset number of target beams.

In a second case, if the base station obtains preambles sent by a UE in a preset time domain resource of the current beam, for example, beam1, the base station continues to obtain preambles from the subsequent preset number of target beams.

In a third case, if the base station obtains preambles sent by a UE in a preset frequency domain resource of the current beam, for example, beam1, the base station continues to obtain a preamble from the subsequent preset number of target beams, and determines the frequency domain resource information used for obtaining the each preamble.

In the embodiment of the present disclosure, a preset number of consecutive target beams detected by the base station is required to be greater than the number of consecutive beams that are used by the UE to send preambles. For example, if the number of consecutive beams that are used by a UE to send preambles is 3, then the above preset number of beams detected is required to be greater than 3. For example, the preset number of beams detected is set to be 5 according to prior information, so as to prevent other UEs from transmitting preambles through the same manner, which causes that preambles sent by the target UE is not detected.

Figure 8:
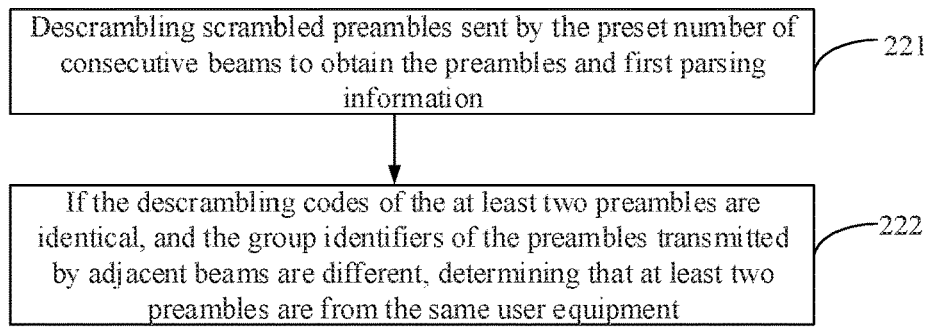
FIG. 8 is a flowchart of another method for controlling random access to a network according to an exemplary embodiment of the present disclosure.

In step 22, identifying target preambles sent by same user equipment;

Corresponding to the above first case, referring to FIG. 8, a flowchart of another method for controlling random access to a network according to an exemplary embodiment is illustrated, the above step 22 can comprise:

In step 221, descrambling scrambled preambles sent by the preset number of consecutive beams to obtain the preambles and first parsing information; wherein, the first parsing information comprises: a descrambling code corresponding to each preamble and a group identifier of a preamble group to which each preamble belongs:

The base station can perform descrambling on each scrambled preamble through a preset scrambling code to determine a descrambling code corresponding to each scrambled preamble. A group identifier of each preamble group to which each preamble belongs is determined according to preset preamble group information.

In step 222, if the descrambling codes of the at least two preambles are identical, and the group identifiers of the preambles transmitted by adjacent beams are different, determining that at least two preambles are from same user equipment.

Exemplarily, as illustrated in Table 7 below:

TABLE 7

| Beam Sequence | Preamble | Group Identifier | Descrambling Code |
|---|---|---|---|
| Beam 1 | 0 | group 1 | Scrambling Code 1 |
| Beam 2 | 5 | group 2 | Scrambling Code 1 |
| Beam 3 | 2 | group 1 | Scrambling Code 1 |

Three scrambled preambles, namely, preamble 0, preamble 5, and preamble 2, are sent by the base station through beam 1, beam 2, and beam 3 respectively. Corresponding parsing information is as illustrated in Table 7. Since the preambles are all successfully descrambled through the scrambling code 1, and group identifiers of the preamble groups to which the preambles obtained by two adjacent beams belong are different, the base station can determine that 0, 5, and 2 are from same UE.

Figure 9:
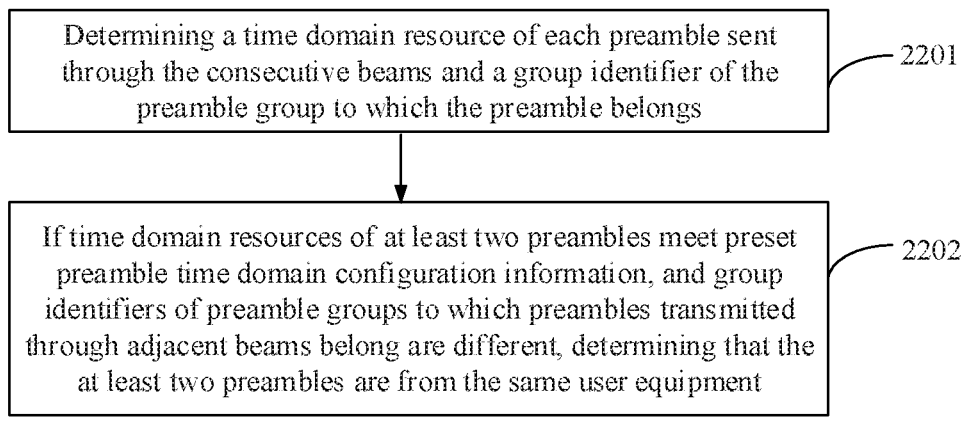
FIG. 9 is a flowchart of another method for controlling random access to a network according to an exemplary embodiment of the present disclosure.

Corresponding to the above second case, referring to FIG. 9, a flowchart of another method for controlling random access to a network according to an exemplary embodiment is illustrated, the above step 22 can comprise:

in step 2201, determining a time domain resource of each preamble sent through the consecutive beams and a group identifier of the preamble group to which the preamble belongs;

in step 2202, if time domain resources of at least two preambles meet a preset preamble time domain configuration information, and group identifiers of preamble groups to which preambles transmitted through adjacent beams belong are different, determining that the at least two preambles are from same user equipment.

Exemplarily, as illustrated in the following Table:

TABLE 8

| Beam Sequence | Target Preamble | Group Identifier | Time Domain Resource |
|---|---|---|---|
| Beam 1 | 0 | group 1 | Slot 1 |
| Beam 2 | 5 | group 2 | Slot 1 |
| Beam 3 | 2 | group 1 | Slot 1 |

The three preambles obtained by the base station through beam 1, beam 2, and beam 3 are: preamble 0, preamble 5, and preamble 2, respectively. The corresponding parsing information is illustrated in Table 8. Since the same time domain resource, namely, slot 1, is used, the preset preamble time domain resource configuration information is met; and group identifiers of preamble groups to which the preambles obtained through two adjacent beams belong are different, so the base station can determine that preamble 0, preamble 5, preamble 2 are from same UE.

Figure 10:
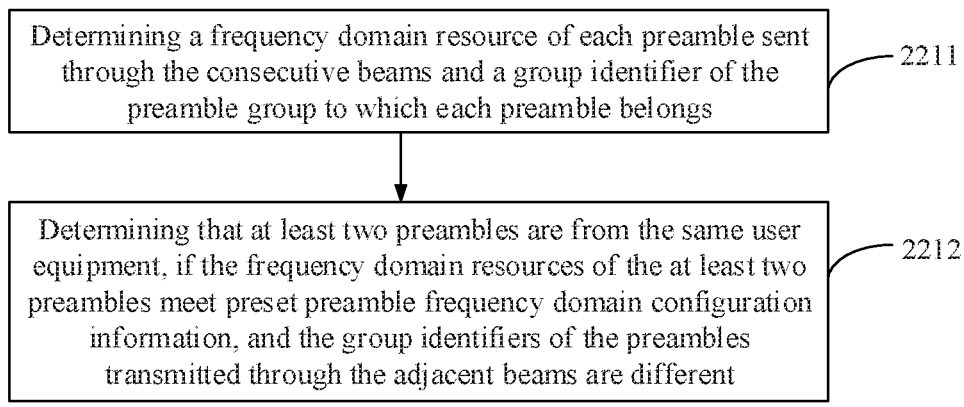
FIG. 10 is a flowchart of another method for controlling random access to a network according to an exemplary embodiment of the present disclosure.

Corresponding to the above third case, referring to FIG. 10, a flowchart of a method for controlling random access to a network according to an exemplary embodiment is illustrate, the above step 22 can comprise:

in step 2211, determining a frequency domain resource of each preamble sent through the consecutive beams and a group identifier of the preamble group to which each preamble belongs;

in step 2212, determining that at least two preambles are from same user equipment, if the frequency domain resources of the at least two preambles meet a preset preamble frequency domain configuration information, and the group identifiers of the preambles transmitted through the adjacent beams are different;

in step 23, sending a random access response message to the user equipment according to the received signal-to-noise ratio of the target preamble, so that the user equipment accesses the network according to the random access response message.

Figure 11:
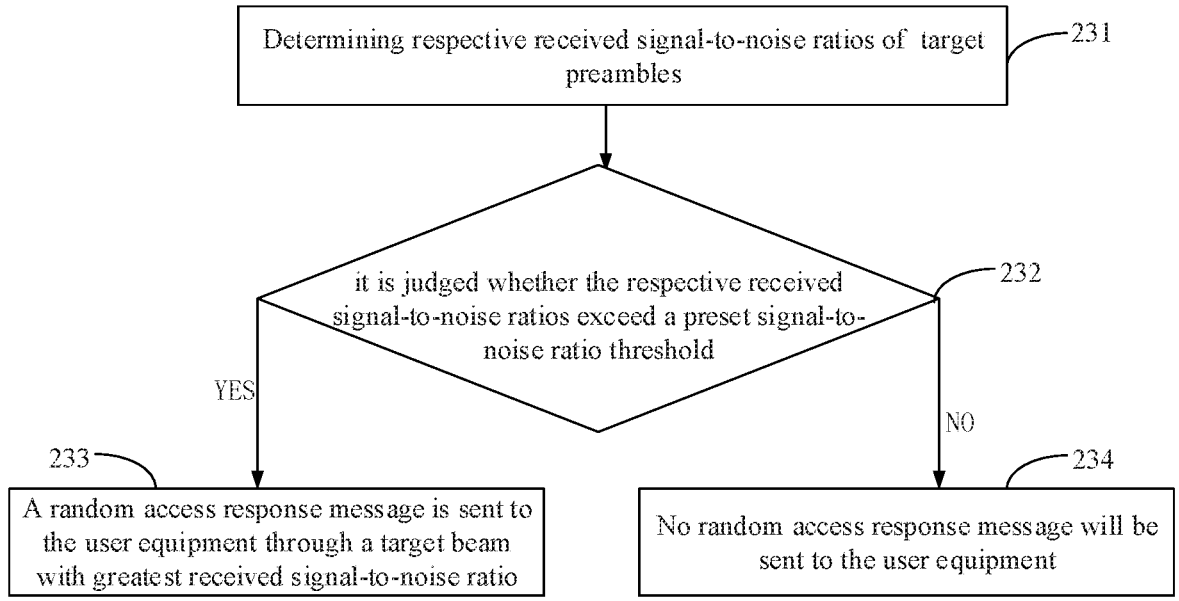
FIG. 11 is a flowchart of another method for controlling random access to a network according to an exemplary embodiment of the present disclosure.

Referring to FIG. 11, a flowchart of another method for controlling random access to a network according to an exemplary embodiment is illustrated, wherein the above step 23 may comprise:

in step 231, determining respective received signal-to-noise ratios of the target preambles:

wherein, a received signal-to-noise ratio of a target preamble can reflect an uplink channel performance of a target beam carrying the target preamble. The higher the received signal-to-noise ratio, the better the uplink channel performance of the target beam.

It is assumed that the base station determines that there are three preambles according to step 22, for example, preamble1, preamble2, and preamble3, which are from same UE, a base station may determine a received signal-to-noise ratio (SNR) of each preamble, which is represented as: SNR1, SNR2 and SNR3 respectively.

In step 232, it is judged whether the respective received signal-to-noise ratios exceed a preset signal-to-noise ratio threshold:

In the embodiment of the present disclosure, the base station can compare received signal-to-noise ratios of the respective target beams carrying the respective target preambles with a preset signal-to-noise ratio threshold SNR0; and judging whether there is a target beam whose received signal-to-noise ratio is greater than the preset signal-to-noise ratio. If yes, step 233 below is performed; if no, step 234 is performed.

In step 233, a random access response message is sent to the user equipment through a target beam with the greatest received signal-to-noise ratio, if at least one received signal-to-noise ratio of the target preambles is greater than the preset signal-to-noise ratio threshold.

Wherein, the random access response message is used to instruct the user equipment to select this beam to access to the network.

In the embodiment of the present disclosure, when the received signal-to-noise ratio of the at least one preamble is greater than the preset signal-to-noise ratio threshold, the base station can directly designate a target beam with the greatest received signal-to-noise ratio as the target access beam for the user equipment, and send to the UE the random access response message that is loaded with information of the designated beam, through a corresponding beam, which can improve efficiency of the UE randomly accessing a network.

In another embodiment of the present disclosure, if the received signal-to-noise ratio of the at least two target preambles among the target preambles parsed by the base station exceeds the preset signal-to-noise ratio threshold, there are two cases that the base station may reply to the random access response message.

In the first case, a base station sends a random access response message in response to a target access preamble with the greatest signal-to-noise ratio;

It is assumed that there are signal-to-noise ratios of two target preambles, such as SNR1 and SNR2, which are greater than the preset signal-to-noise ratio threshold SNR0.

The difference $\Delta S$ between the signal-to-noise ratios of the two target preambles can be calculated. If $\Delta S$ is greater than the preset threshold, the base station will send a random access response message in response to a target access preamble with the greatest received signal-to-noise ratio.

On the contrary, if $\Delta S$ is less than or equal to the preset threshold, the base station will send the corresponding random access response message respectively based on the two target preambles, so that the user equipment selects the target access beam according to the two random access response messages.

In step 234, if the respective received signal-to-noise ratios of the target preambles do not exceed the preset signal-to-noise ratio threshold, no random access response message will be sent to the user equipment.

Correspondingly, after the user equipment sends the preamble, a random access response message detecting window is opened. If the random access response message sent by a base station is not detected in the random access response message detecting window, the UE is triggered to resend preambles to a base station.

It can be seen that a base station can identify the identity of a UE that sends the random access request according to the received random access preamble. After parsing a plurality of preambles that are continuously sent by multiple UEs through multiple beams, the target access beam can be directly designated for a UE, or multiple random access response messages can be returned for a UE to select a target access beam, thereby effectively improving the success rate of random access to a network for a UE, and thereby improving the reliability of random access for a UE.

For the foregoing methods and embodiments, for the sake of brevity, they are all described as combinations of a series of actions, but those skilled in the art should understand that the present disclosure is not limited by the order of described actions, because according to the present disclosure, some steps can be performed in other orders or at the same time.

In addition, those skilled in the art should also understand that the embodiments described in the specification are optional embodiments, and the actions and modules involved are not necessarily required by the disclosure.

Corresponding to the above embodiments of application function implementation method, the present disclosure further provides embodiments of application function implementation apparatus and corresponding terminal.

Figure 12:
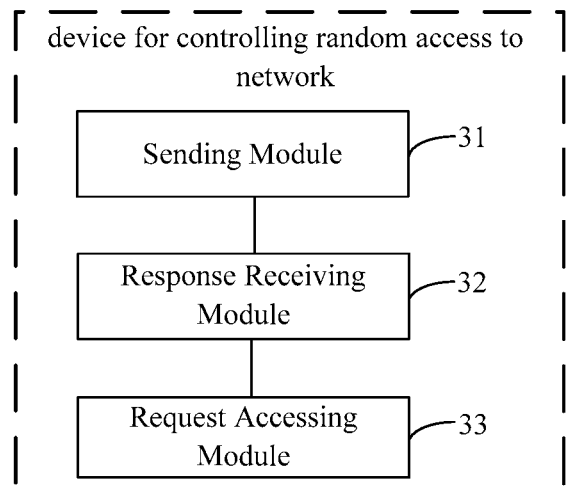
FIG. 12 is a block diagram of a user equipment according to an exemplary embodiment of the present disclosure.

Referring to FIG. 12, a block diagram of a device for controlling random access to a network according to an exemplary embodiment is illustrated, the device is disposed in user equipment and may comprise:

a sending module 31, configured to send random access preambles to a base station through at least two consecutive beams, wherein the preambles carried by two adjacent beams belong to different preamble groups:

a response receiving module 32, configured to receive a random access response message sent by the base station in response to the preambles; and a request accessing module 33, configured to access a network according to the random access response message.

Figure 13:
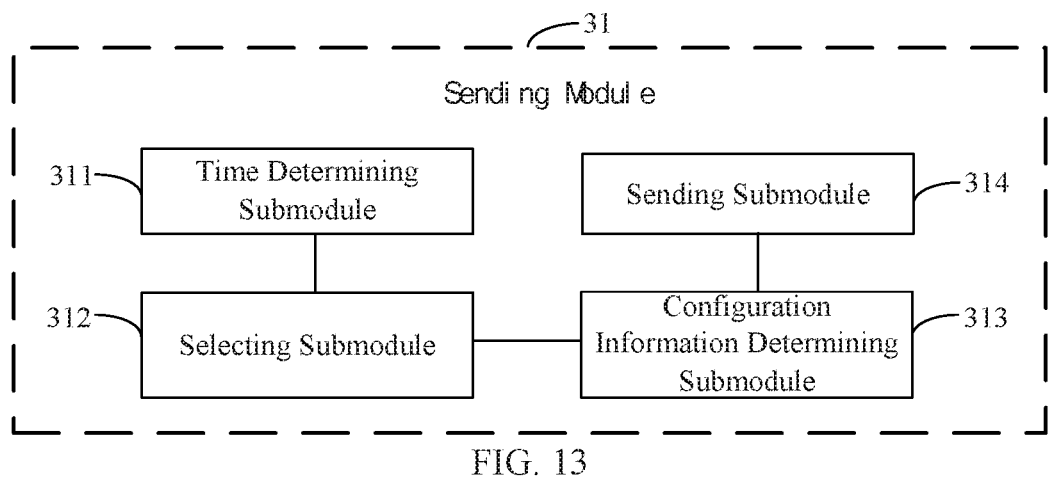
FIG. 13 is a block diagram of another user equipment according to an exemplary embodiment of the present disclosure.

Referring to FIG. 13, a block diagram of a device for controlling random access to a network according to an exemplary embodiment is illustrated, on the basis of the embodiment of device illustrated in FIG. 12, the sending module 31 may comprise:

a time determining submodule 311, configured to determine an estimated arrival time of at least two consecutive target beams after detecting a synchronization signal beam, wherein the target beams are used to send the preambles;

a selecting submodule 312, configured to select a target preamble for each of the target beams according to a preset preamble group;

a configuration information determining submodule 313, configured to determine a configuration information of each target preamble according to a preset transmission configuration information, wherein the configuration information of each target preamble comprises at least one of the following: a scrambling code for scrambling, a time domain resource carrying the target preamble, and a frequency domain resource carrying the target preamble:

a sending submodule 314, configured to send, according to the configuration information of each target preamble, the target preamble to the base station in the arrival time range of the respective target beam.

Figure 14:
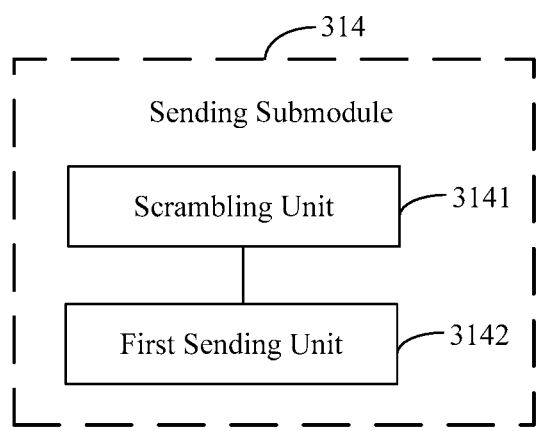
FIG. 14 is a block diagram of another user equipment according to an exemplary embodiment of the present disclosure.

Referring to FIG. 14, a block diagram of a device for controlling random access to a network according to an exemplary embodiment is illustrated, and on the basis of the embodiment of device illustrated in FIG. 13, the sending submodule 314 can comprise:

a scrambling unit 3141, configured to scramble the target preamble with a preset scrambling code, so as to obtain a scrambled preamble.

a first sending unit 3142, configured to send the scrambled preamble to the base station through the target beam.

Figure 15:
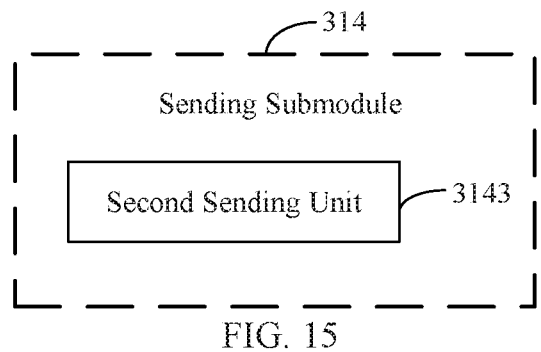
FIG. 15 is a block diagram of another user equipment according to an exemplary embodiment of the present disclosure.

Referring a block diagram of a device for controlling random access to a network according to an exemplary embodiment as illustrated in FIG. 15, on the basis of the embodiment of device as illustrated in FIG. 13, the sending submodule 314 can comprise:

a second sending unit 3413, configured to send the target preamble to the base station with a preset time domain resource of a target beam.

Figure 16:
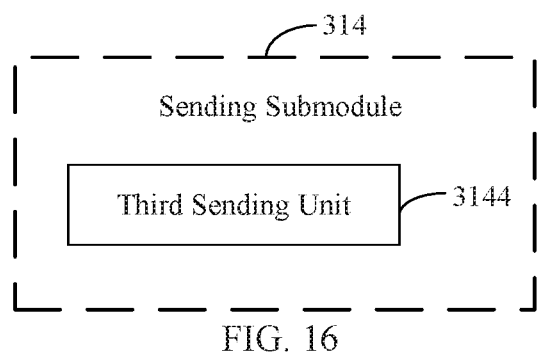
FIG. 16 is a block diagram of another user equipment according to an exemplary embodiment of the present disclosure.

Referring a block diagram of a device for controlling random access to a network according to an exemplary embodiment as illustrated in FIG. 16, on the basis of the embodiment of device as illustrated in FIG. 13, the sending submodule 314 can comprise:

a third sending unit 3414, configured to send the target preamble to the base station with a preset time domain resource of a target beam.

Figure 17:
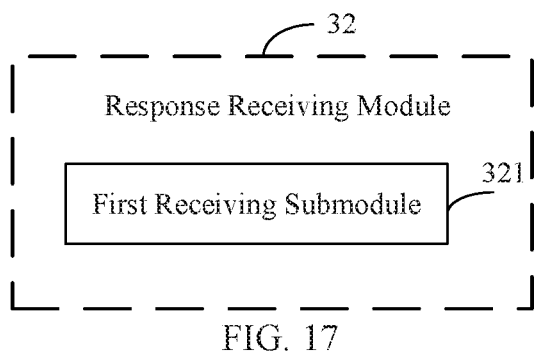
FIG. 17 is a block diagram of another user equipment according to an exemplary embodiment of the present disclosure.

Referring a block diagram of a device for controlling random access to a network according to an exemplary embodiment as illustrated in FIG. 17, on the basis of the embodiment of device as illustrated in FIG. 12, the response receiving module 32 can comprise:

a first receiving submodule 321, configured to access a network through a target access beam indicated by the response message, if a random access response message is received.

Figure 18:
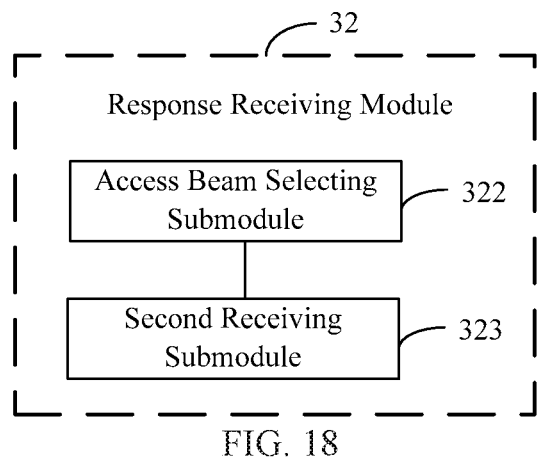
FIG. 18 is a block diagram of another user equipment according to an exemplary embodiment of the present disclosure.

Referring a block diagram of a device for controlling random access to a network according to an exemplary embodiment as illustrated in FIG. 18, on the basis of the embodiment of device illustrated in FIG. 12, the response receiving module 32 can comprise:

an access beam selecting submodule 322, configured to select one from access beams indicated by at least random access response messages as a target access beam, if the at least two random access response messages are received; and a second receiving submodule 323, configured to access a network through the target access beam.

Figure 19:
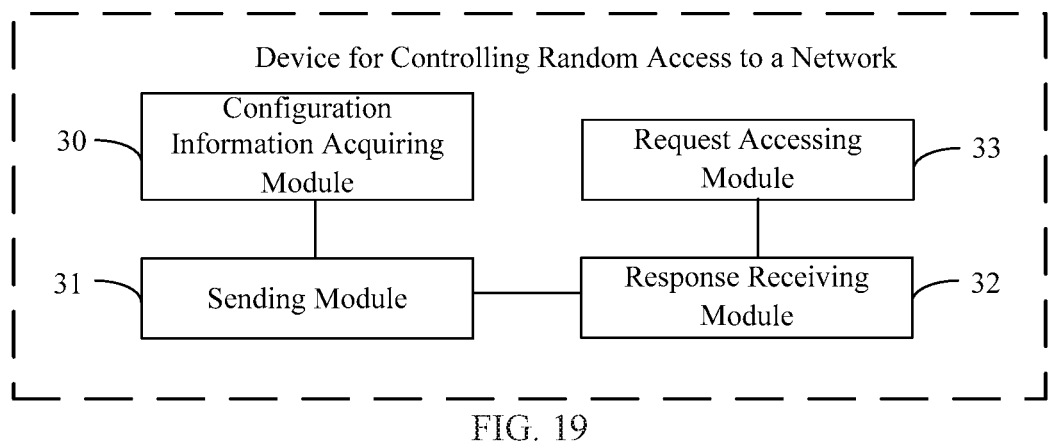
FIG. 19 is a block diagram of another user equipment according to an exemplary embodiment of the present disclosure.

Referring to a block diagram of a device for controlling random access to a network according to an exemplary embodiment as illustrated in FIG. 19, on the basis of the embodiment of device illustrated in FIG. 12, the device can further comprise:

a configuration information acquiring module 30, configured to obtain preamble uplink configuration information, wherein, the preamble uplink configuration information comprises: a preset number of target beams, preset preamble group information, and preset transmission configuration information.

Correspondingly, the present disclosure further provides a device for controlling random access a network, which is applicable to a base station.

Figure 20:
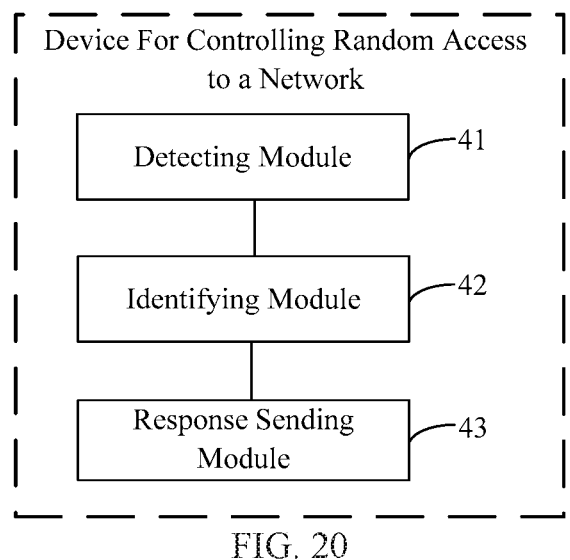
FIG. 20 is a block diagram of a base station according to an exemplary embodiment of the present disclosure.

Referring a block diagram of a device for controlling random access to a network according to an exemplary embodiment as illustrated in FIG. 20, the device can comprise:

a detecting module 41, configured to detect preambles continuously sent by a preset number of beams;

an identifying module 42, configured to identify target preambles sent by same user equipment:

a response sending module 43, configured to send a random access response message to the user equipment according to received signal-to-noise ratios of the target preambles, so that the user equipment accesses a network according to the random access response message.

Figure 21:
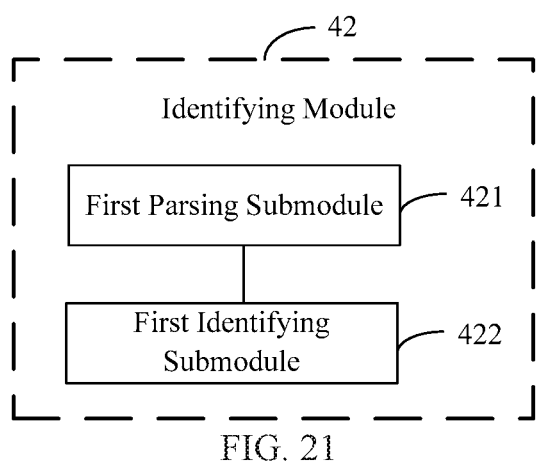
FIG. 21 is a block diagram of another base station according to an exemplary embodiment of the present disclosure.

Referring a block diagram of a device for controlling random access to a network according to an exemplary embodiment as illustrated in FIG. 21, on the basis of the embodiment of device as illustrated in FIG. 20, the identifying module 42 can comprise:

a first parsing submodule 421, configured to descramble scrambled preambles sent through the preset number of consecutive beams so as to obtain the preambles and first parsing information; wherein, the first parsing information comprises: a descrambling code corresponding to each preamble and a group identifier of a preamble group to which each preamble belongs;

a first identifying submodule 422, configured to identify that the at least two preambles are from same user equipment, if the descrambling codes of at least two preambles are identical, and the group identifiers of the preambles transmitted through adjacent beams are different.

Figure 22:
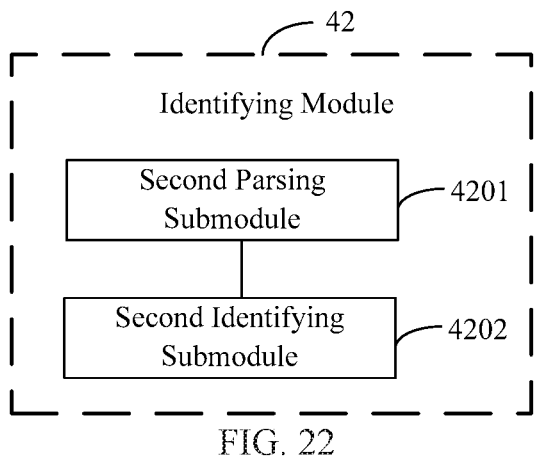
FIG. 22 is a block diagram of another base station according to an exemplary embodiment of the present disclosure.

Referring a block diagram of a device for controlling random access to a network according to an exemplary embodiment as illustrated in FIG. 22, on the basis of the embodiment of device illustrated in FIG. 20, the identifying module 42 can comprise:

a second parsing submodule 4201, configured to determine a time domain resource of each preamble sent through the consecutive beams and a group identifier of a preamble group to which each preamble belongs;

a second identifying submodule 4202, configured to identify that the at least two preambles are from same user equipment if the time domain resources of the at least two preambles meet a preset preamble time domain configuration information, and the group identifiers of the preambles transmitted through adjacent beams are different.

Figure 23:
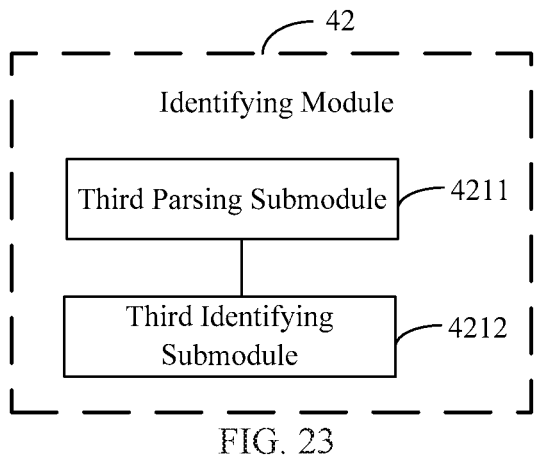
FIG. 23 is a block diagram of another base station according to an exemplary embodiment of the present disclosure.

Referring a block diagram of a device for controlling random access to a network according to an exemplary embodiment as illustrated in FIG. 23, on the basis of the embodiment of device illustrated in FIG. 20, the identifying module 42 can comprise:

a third parsing submodule 4211, configured to determine a time domain resource of each preamble sent through the consecutive beams and a group identifier of a preamble group to which the preamble belongs;

a third identifying submodule 4212, configured to identify that the at least two preambles are from same user equipment if frequency domain resources of at least two preambles meet a preset frequency preamble domain configuration information, and preamble group identifiers transmitted through adjacent beams are different.

Figure 24:
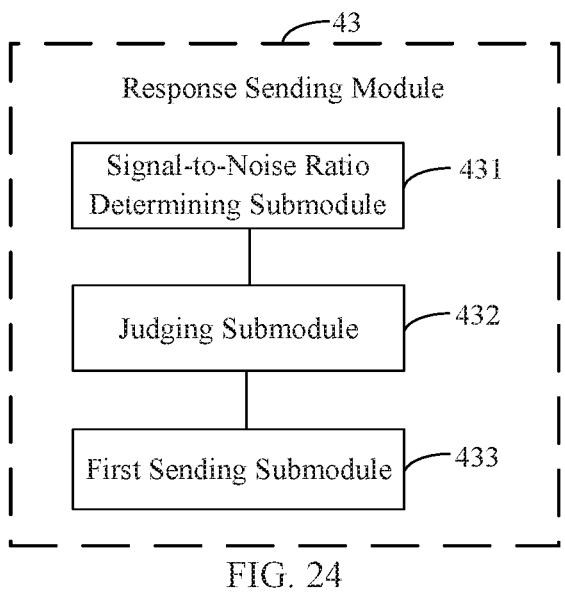
FIG. 24 is a block diagram of another base station according to an exemplary embodiment of the present disclosure.

Referring a block diagram of a device for controlling random access to a network according to an exemplary embodiment as illustrated in FIG. 24, on the basis of the embodiment of device illustrated in FIG. 20, the response sending module 34 can comprise:

a signal-to-noise ratio determining submodule 431, configured to determine a received signal-to-noise ratio of a target beam carrying the each target preamble;

a judging submodule 432, configured to judge whether each of the received signal to noise ratios exceeds a preset signal-to-noise ratio threshold;

a first sending submodule 433, configured to send a random access response message to the user equipment through a target beam corresponding a greatest received signal-to-noise ratio, if at least one received signal-to-noise ratio is greater than the preset signal-to-noise ratio threshold.

Figure 25:
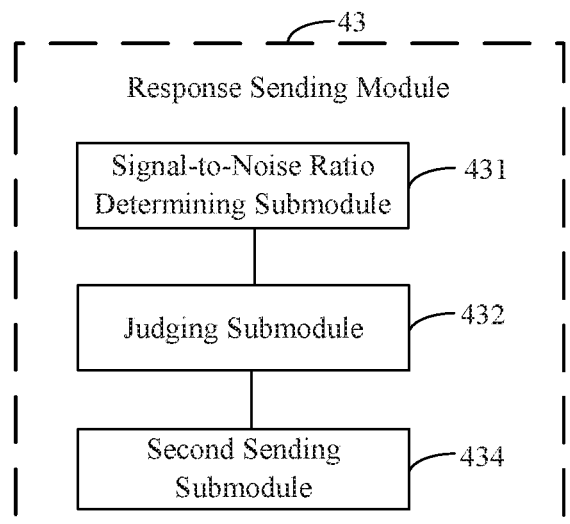
FIG. 25 is a block diagram of another base station according to an exemplary embodiment of the present disclosure.

Referring a block diagram of a device for controlling random access to a network according to an exemplary embodiment as illustrated in FIG. 25, on the basis of the embodiment of device illustrated in FIG. 24, the response sending module 34 can further comprise:

a second sending submodule 434, configured to send a random access response message in response to each of the target preambles if the received signal-to-noise ratio of each target preamble not exceeds the preset signal-to-noise ratio threshold.

For the device embodiment, since it basically corresponds to the method embodiment, reference can be made to the related description of the method embodiment. The embodiments of the device described above are merely illustrative, wherein the units described as separate components may or may not be physically separate, and the components displayed as units may or may not be physical units, that is, may be located at one place, or it may be distributed to multiple network units. Some or all of the modules can be selected according to actual requirements to achieve the purpose of the solution of the present disclosure. Those of ordinary skill in the art can understand and implement without any creative effort.

Correspondingly, on one hand, there is provided a device for controlling random access to a network, the device comprising:

a processor:

a memory configured to store instructions executable by the processor;

wherein the processor is configured to:

send random access preambles to a base station through at least two consecutive beams, wherein the preambles carried by two adjacent beams belong to different preamble groups;

receive a random access response message sent by the base station in response to the preambles:

access a network according to the random access response message.

Correspondingly, on the other hand, there is provided another device for controlling random access to a network, the device comprising:

a processor:

a memory, configured to store instructions executable by processor;

wherein the processor is configured to:

detect preambles continuously sent through a preset number of beams:

identify target preambles sent by same user equipment;

send a random access response message to the user equipment according to the received signal-to-noise ratio of the target preamble, so that the user equipment accesses a network according to the random access response message.

Figure 26:
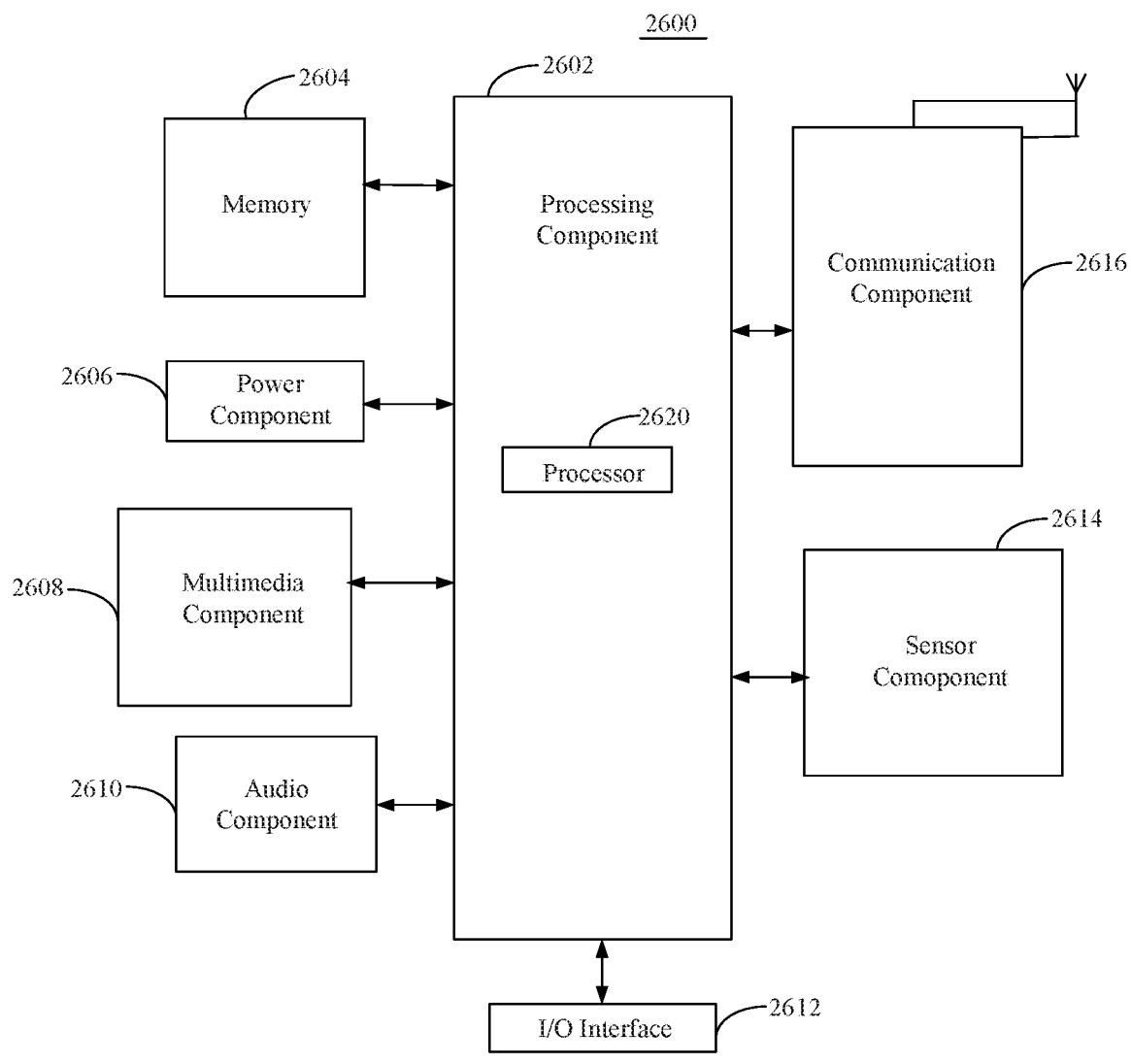
FIG. 26 is a schematic structural diagram of a user equipment according to an exemplary embodiment of the present disclosure.

FIG. 26 is a schematic diagram of device 2600 for controlling random access to a network according to an exemplary embodiment. For example, the device 2600 can be a terminal, and may specifically be a mobile phone, a computer, a digital broadcast terminal, a messaging device, a game console, a tablet device, a medical device, a fitness device, a personal digital assistant, a wearable device such as a smart watch, smart glasses, smart bracelets, smart running shoes, and so on.

Referring to FIG. 26, the device 2600 can comprise one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls the overall operations of the device 2600, such as operations associated with display, telephone calls, data communications, camera operations, and recording operations. The processing component 2602 can comprise one or more processors 2620 to execute instructions to perform all or part of the steps of the methods described above. Moreover, the processing component 2602 can comprise one or more modules to facilitate interaction between the processing component 2602 and other components. For example, the processing component 2602 can comprise a multimedia module to facilitate interaction between the multimedia component 2608 and the processing component 2602.

The memory 2604 is configured to store various types of data to support operations at device 2600. Examples of such data comprise instructions for any application or method run on the device 2600, contact data, phone book data, messages, pictures, videos, and the like. The memory 2604 can be implemented by any type of volatile or non-volatile storage device or a combination thereof, such as Static Random Access Memory (SRAM). Electrically Erasable Programmable Read Only Memory (EEPROM), Erasable Programmable Read Only Memory (EPROM), Programmable Read Only Memory (PROM), Read Only Memory (ROM), Magnetic Memory. Flash Memory, Magnetic Disk or Optical Disk.

The power component 2606 provides power to various components of the device 2600. The Power component 2606 can comprise a power management system, one or more power sources, and other components associated with generating, managing, and distributing power for the device 2600.

The multimedia component 2608 comprises a screen between the device 2600 and the user that provides an output interface. In some embodiments, the screen can comprise a Liquid Crystal Display (LCD) and a Touch Panel (TP). If the screen comprises a touch panel, the screen can be implemented as a touch screen to receive input signals from the user. The touch panel comprises one or more touch sensors to sense touches, draws, and gestures on the touch panel. The touch sensor can sense not only the boundaries of the touch or drawing action, but also the duration and pressure associated with the touch or drawing operation. In some embodiments, the multimedia component 2608 comprises a front camera and/or a rear camera. When the device 2600 is in an operation mode, such as a shooting mode or a video mode, the front camera and/or the rear camera can receive external multimedia data. Each front and rear camera can be a fixed optical lens system or have a focal length and optical zoom capabilities.

The audio component 2610 is configured to output and/or input an audio signal. For example, the audio component 2610 comprises a microphone (MIC) that is configured to receive an external audio signal when device 2600 is in an operational mode, such as a call mode, a recording mode, and a voice recognition mode. The received audio signal may be further stored in memory 2604 or sent via communication component 2616. In some embodiments, audio component 2610 can further comprise a speaker for outputting an audio signal.

The I/O interface 2612 provides an interface between the processing component 2602 and peripheral interface modules, which may be a keyboard, a click wheel, a button, or the like. The button may comprise, but are not limited to, a home button, a volume button, a start button, and a lock button.

The sensor assembly 2614 comprises one or more sensors for providing status assessment of various aspects to the device 2600. For example, the sensor component 2614 can detect an ON/OFF state of the device 2600, a relative positioning of components, such as a display and a keypad of the device 2600, and the sensor component 2614 can further detect a change in position of a component of the device 2600 or the device 2600, the presence or absence of contact between user and the device 2600, the orientation or acceleration/deceleration of the device 2600 and the temperature change of the device 2600. The sensor assembly 2614 can comprise a proximity sensor configured to detect presence of nearby objects without any physical contact. The sensor component 2614 can further comprise a light sensor, such as a CMOS or CCD image sensor, for use in imaging applications. In some embodiments, the sensor assembly 2614 can further comprise an acceleration sensor, a gyro sensor, a magnetic sensor, a pressure sensor, or a temperature sensor.

The communication component 2616 is configured to facilitate wired or wireless communication between the device 2600 and other devices. The device 2600 can access a wireless network under a communication standard, such as WiFi, 2G or 3G. or a combination thereof. In an exemplary embodiment, the communication component 2616 receives broadcast signals or broadcast associated information from an external broadcast management system via a broadcast channel. In an exemplary embodiment, the communication component 2616 further comprises a near field communication (NFC) module to facilitate short range communication. For example, the NFC module can be implemented based on Radio Frequency Identification (RFID) technology, Infrared Data Association (IrDA) technology, Ultra-wideband (UWB) technology, Bluetooth (BT) technology, and other technologies.

In an exemplary embodiment, the device 2600 can be implemented via one or more application specific integrated circuits (ASICs), a digital signal processors (DSP), a digital signal processing device (DSPD), a programmable logic device (PLD), a field programmable gate array (FPGA), a controller, a microcontroller, a microprocessor, or other electronic component used for performing the above methods.

In an exemplary embodiment, there is also provided a non-transitory computer readable storage medium with computer instructions stored thereon, wherein, the computer instructions can be executable by the processing component 2622 of the device 2600 to complete any of the method for controlling random access to a network described in FIGS. 1-6. For example, the non-transitory computer readable storage medium can be a ROM, a random access memory (RAM), a CD-ROM, a magnetic tape, a floppy disk, and an optical data storage apparatus.

Figure 27:
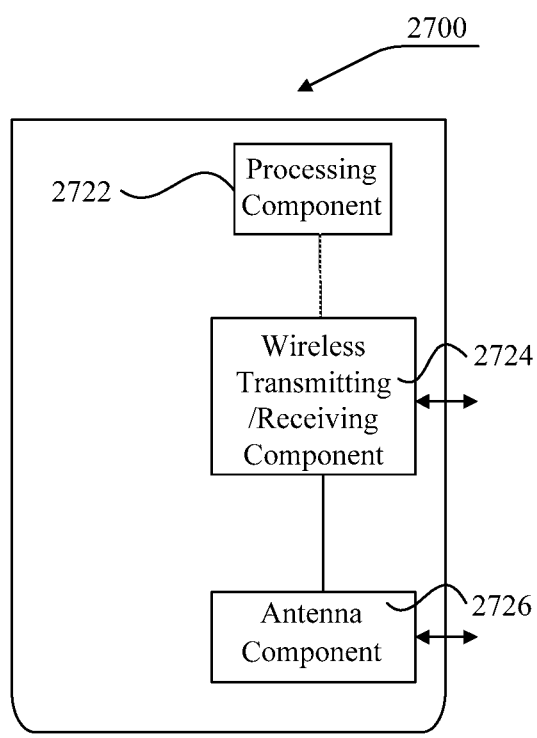
FIG. 27 is a schematic structural diagram of a base station according to an exemplary embodiment of the present disclosure.

As illustrated in FIG. 27, which is a schematic diagram of the device 2700 for controlling random access to a network according to an exemplary embodiment, the device 2700 can be provided as a base station.

Referring to FIG. 27, the device 2700 comprises a processing component 2722, a wireless transmit/receive component 2724, an antenna component 2726, and a signal processing portion specific to the wireless interface. The processing component 2722 can further comprise one or more processors.

One of the processors in the processing component 2722 can be configured to:

detect preambles continuously sent through a preset number of beams;

determine target preambles sent by same user equipment; and send a random access response message to a user equipment according to received signal-to-noise ratios of the target preambles, so that the user equipment accesses the network according to the random access response message.

In an exemplary embodiment, there is also provided a non-transitory computer readable storage medium with computer instructions stored thereon, wherein, the computer instructions can be executable by the processing component 2722 of the device 2700 to complete any of the method for controlling random access to a network described in FIGS. 7-11. For example, the non-transitory computer readable storage medium can be a ROM, a random access memory (RAM), a CD-ROM, a magnetic tape, a floppy disk, and an optical data storage apparatus.

Other embodiments of the present disclosure will be readily apparent to those skilled in the art. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is set forth by the claims below.

It should be understood that this disclosure is not limited to the exact structure described above and shown in the accompanying drawings, and can be subject to various modifications and changes without deviating from its scope. The scope of the disclosure is to be limited only by the appended claims.

What is claimed is:

1. A method for controlling random access to a network, wherein the method is applicable to user equipment and comprises:
   sending random access preambles to a base station through at least two consecutive beams, wherein the preambles carried by two adjacent beams belong to different preamble groups;
   receiving a random access response message sent by the base station in response to the preambles received through the at least two consecutive beams, wherein the base station determines respective received signal-to-noise ratios of the preambles, determines whether the respective received signal-to-noise ratios exceed a preset signal-to-noise ratio threshold, and sends the random access response message to the user equipment through a beam with a greatest received signal-to-noise ratio, if a received signal-to-noise ratio of at least one preamble is greater than the preset signal-to-noise ratio threshold; and
   accessing a network according to the random access response message,
   wherein accessing the network according to the random access response message comprises:
   if at least two random access response messages are received, selecting a target access beam from access beams indicated by the at least two response messages, respectively; and
   accessing the network through the target access beam.

2. The method according to claim 1, wherein sending random access preambles to the base station through the at least two consecutive beams comprises:
   after detecting a synchronization signal beam, determining estimated arrival times of at least two consecutive target beams, wherein the target beams are configured to send the preambles;
   selecting a target preamble for each of the target beams according to a preset preamble group;
   determining configuration information of each target preamble according to preset transmission configuration information, wherein the configuration information of each target preamble comprises at least one of the following: a scrambling code for scrambling, a time domain resource carrying the target preamble, and a frequency domain resource carrying the target preamble; and
   sending, according to the configuration information of each target preamble, the target preamble to the base station in an arrival time range of the respective target beam.

3. The method according to claim 2, wherein sending, according to the configuration information of each target preamble, the target preamble to the base station, comprises:
   scrambling the target preamble with a preset scrambling code so as to obtain a scrambled preamble; and
   sending the scrambled preamble to the base station through the target beam.

4. The method according to claim 2, wherein sending, according to the configuration information of each target preamble, the target preamble to the base station, comprises:
   sending the target preamble to the base station with a preset time domain resource of the target beam.

5. The method according to claim 2, wherein sending, according to the configuration information of each target preamble, the target preamble to the base station, comprises:
   sending the target preamble to the base station with a preset frequency domain resource of the target beam.

6. The method according to claim 1, wherein accessing the network according to the random access response message comprises:
   if one random access response message is received, accessing the network through a target access beam indicated by the one response message.

7. The method according to claim 1, wherein before sending the random access preambles to the base station through the at least two consecutive beams, the method further comprises:
   obtaining preamble uplink configuration information, wherein the preamble uplink configuration information comprises: a preset number of target beams, preset preamble group information, and preset transmission configuration information.

8. User equipment, comprising:
   a processor; and
   a memory storing instructions executable by the processor;
   wherein the processor is configured to:
   send random access preambles to a base station through at least two consecutive beams, wherein the preambles carried by two adjacent beams belong to different preamble groups;
   receive a random access response message sent by the base station in response to the preambles received through the at least two consecutive beams, wherein the base station determines respective received signal-to-noise ratios of the preambles, determines whether the respective received signal-to-noise ratios exceed a preset signal-to-noise ratio threshold, and sends the random access response message to the user equipment through a beam with a greatest received signal-to-noise ratio, if a received signal-to-noise ratio of at least one preamble is greater than the preset signal-to-noise ratio threshold; and
   access a network according to the random access response message,
   wherein the processor is further configured to:
   select a target access beam from access beams indicated by at least two response messages, respectively, if the at least two random access response messages are received; and
   access the network through the target access beam.

9. The user equipment according to claim 8, wherein the processor is further configured to:
  determine estimated arrival times of at least two consecutive target beams after detecting a synchronization signal beam, wherein the target beams are configured to send the preambles;
  select a target preamble for each of the target beams according to a preset preamble group;
  determine configuration information of each target preamble according to preset transmission configuration information, wherein the configuration information of each target preamble comprises at least one of the following: a scrambling code for scrambling, a time domain resource carrying the target preamble, and a frequency domain resource carrying the target preamble; and
  send, according to the configuration information of each target preamble, the target preamble to the base station in an arrival time range of the respective target beam.

10. The user equipment according to claim 9, wherein the processor is further configured to:
  scramble the target preamble through a preset scrambling code so as to obtain a scrambled preamble; and
  send the scrambled preamble to the base station through the target beam.

11. The user equipment according to claim 9, wherein the processor is further configured to:
  send the target preamble to the base station with a preset time domain resource of a target beam.

12. The user equipment according to claim 9, wherein the processor is further configured to:
  send the target preamble to the base station with a preset frequency domain resource of a target beam.

13. The user equipment according to claim 8, wherein the processor is further configured to:
  if one random access response message is received, access the network through a target access beam indicated by the one response message.

14. The user equipment according to claim 8, wherein the processor is further configured to:
  obtain preamble uplink configuration information, wherein the preamble uplink configuration information comprises: a preset number of target beams, preset preamble group information, and preset transmission configuration information.

15. A base station, comprising:
  a processor; and
  a memory storing instructions executable by the processor;
  wherein the processor is configured to:
  detect preambles continuously sent through a preset number of consecutive beams;
  identify target preambles sent by same user equipment; and
  send a random access response message to the user equipment according to received signal-to-noise ratios of the target preambles, so that the user equipment accesses a network according to the random access response message,
  wherein the processor is further configured to:
  determine respective received signal-to-noise ratios of the target preambles;
  determine whether the respective received signal-to-noise ratios exceed a preset signal-to-noise ratio threshold; and
  send a random access response message to the user equipment through a target beam with a greatest received signal-to-noise ratio, if a received signal-to-noise ratio of at least one target preamble is greater than the preset signal-to-noise ratio threshold.

16. The base station according to claim 15, wherein the processor is further configured to:
  descramble scrambled preambles sent through the preset number of consecutive beams to obtain preambles and first parsing information; wherein the first parsing information comprises: a descrambling code corresponding to each preamble and group identifiers of preamble groups to which the preambles belong; and
  if descrambling codes of at least two preambles are identical, and group identifiers of the preambles transmitted through adjacent beams are different, determine that the at least two preambles are from the same user equipment.

17. The base station according to claim 15, wherein the processor is further configured to:
  determine a time domain resource of each preamble sent by the consecutive beams and a group identifier of a preamble group to which the preamble belongs; and
  if the time domain resources of at least two preambles meet preset preamble time domain configuration information, and the group identifiers of the preambles transmitted by adjacent beams are different, determine that the at least two preambles are from the same user equipment.

18. The base station according to claim 15, wherein the processor is further configured to:
  determine a time domain resource of each preamble sent by the consecutive beams and a group identifier of a preamble group to which the preamble belongs; and
  determine that at least two preambles are from same user equipment if frequency domain resources of the at least two preambles meet preset preamble frequency domain configuration information, and the group identifiers of the preambles transmitted through adjacent beams are different.

19. The base station according to claim 15, wherein the processor is further configured to:
  if the received signal-to-noise ratios of at least two target preambles are greater than the preset signal-to-noise ratio threshold, and difference between every two received signal-to-noise ratios is less than a preset threshold, send a random access response message in response to each of the target preambles.

* * * * *